H. B. KINCAID.
ILLUMINATED LICENSE NUMBER.
APPLICATION FILED JULY 23, 1915.
1,193,153.
Patented Aug. 1, 1916.
2 SHEETS—SHEET 1.
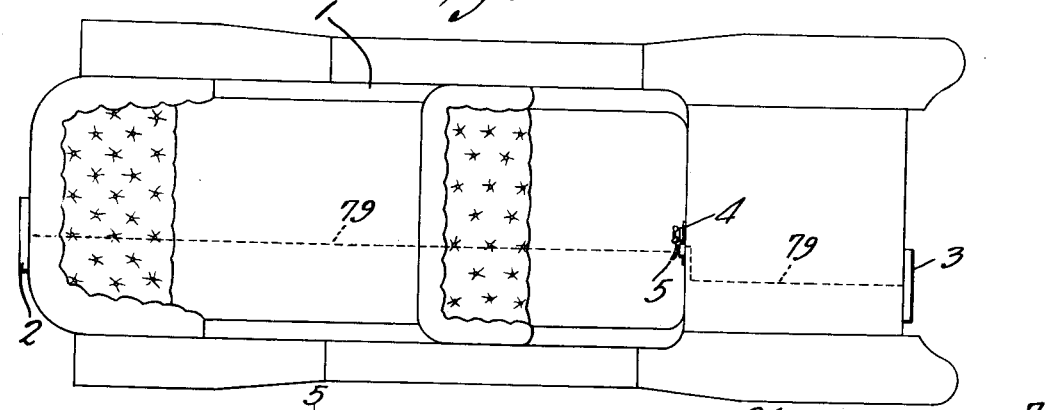
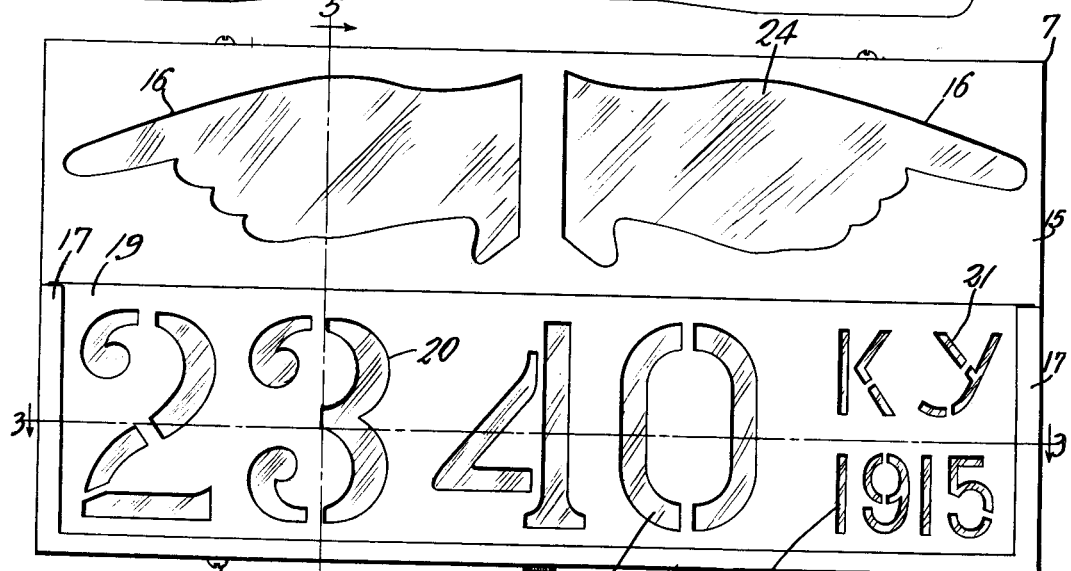
Witnesses
*Horace B. Kincaid* Inventor
by *C. A. Snow & Co.*
Attorneys H. B. KINCAID.
ILLUMINATED LICENSE NUMBER.
APPLICATION FILED JULY 23, 1915.
1,193,153.
Patented Aug. 1, 1916.
2 SHEETS—SHEET 2.
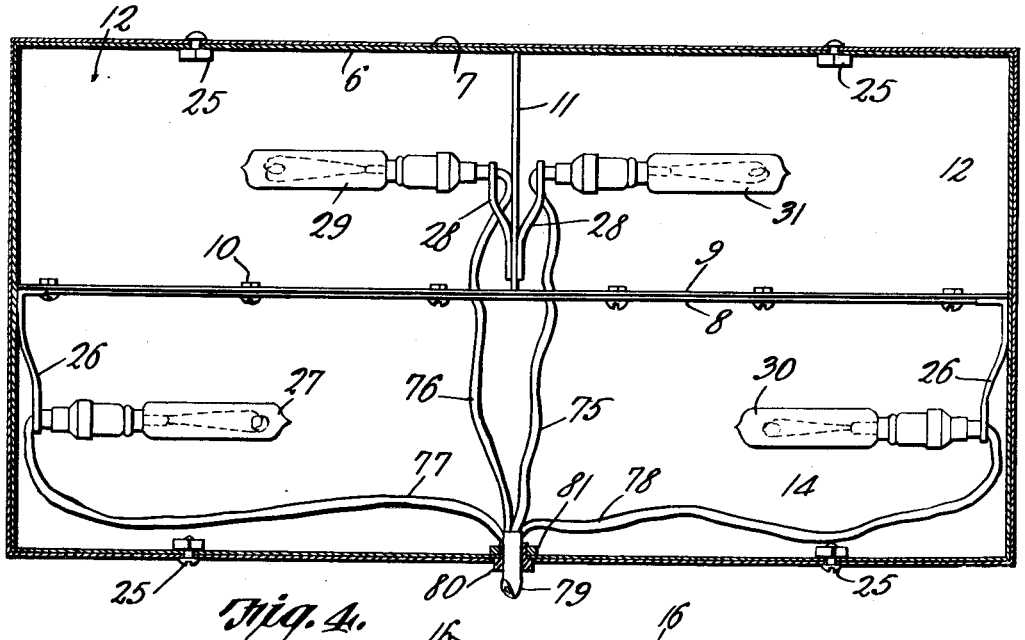
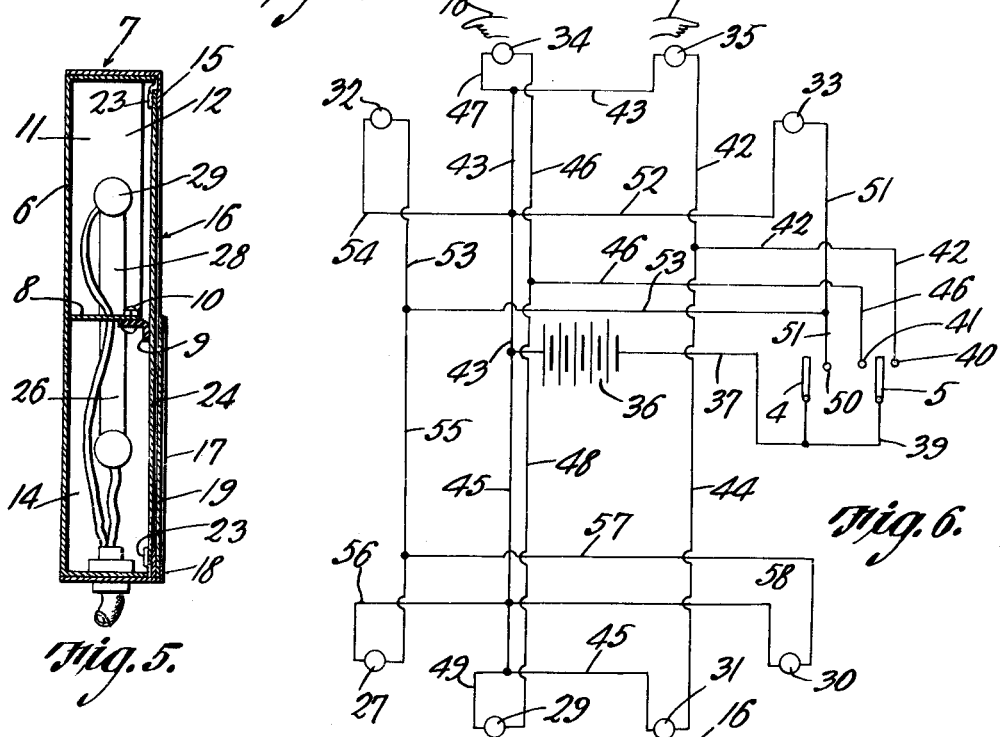
Witnesses
Horace B. Kincaid, Inventor
by C.A. Snow & Co.
Attorneys

UNITED STATES PATENT OFFICE.

HORACE B. KINCAID, OF LOUISVILLE, KENTUCKY.

ILLUMINATED LICENSE-NUMBER.

1,193,153.     Specification of Letters Patent.     Patented Aug. 1, 1916.

Application filed July 23, 1915. Serial No. 41,555.

*To all whom it may concern:*

Be it known that I, HORACE B. KINCAID, a citizen of the United States, residing at Louisville, in the county of Jefferson and State of Kentucky, have invented a new and useful Illuminated License-Number, of which the following is a specification.

The device forming the subject matter of this application is a signal adapted to be applied to the front or to the rear of a motor propelled vehicle, for the purpose of illuminating the license number and for the further purpose of indicating in which direction the occupant of the vehicle proposes to steer.

The invention aims to improve the casing portion of the signal, to the end that the indicators and the license number may be illuminated in different colors.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing: Figure 1 shows in top plan, a vehicle equipped with the device forming the subject matter of this application; Fig. 2 is an elevation showing one of the signal casings; Fig. 3 is a section on the line 3—3 of Fig. 2; Fig. 4 is a vertical longitudinal section of the signal casing; Fig. 5 is a vertical transverse section of the signal casing; Fig. 6 is a diagram illustrating the circuits of the signals.

In the drawings, the numeral 1 indicates a vehicle provided with a rear signal 2 and with a front signal 3. Mounted at any accessible points on the vehicle 1 are switches 4 and 5. The signals 2 and 3 are duplicates of each other and but one of them, therefore, need be described. Each signal comprises a back 6 and a front 7, the back 6 being telescoped into the front 7. Extended longitudinally of the back 6 is a partition 8 carrying a forwardly presented, resilient flange or strip 9, held in place by securing elements 10. The resilient flange or strip constitutes a light closure between the compartments in the top of the casing on the one hand, and the compartment on the bottom of the casing on the other hand. A transverse partition 11 extends between the longitudinal partition 8 and the top of the back portion 6 of the casing. The longitudinal partition 8—9 forms in the casing, a lower compartment 14, the transverse partition 11 coöperating with the partition 8—9 to form in the top of the casing, a pair of side compartments 12. Extended across the upper portion of the front 3 of the casing and constituting a part thereof is an opaque face plate 15 provided with openings 16 shaped to form indicators which point laterally in opposite directions, the indicators preferably but not necessarily being formed to approximate the outline of the human hand.

The front 7 of the casing is provided with side guides 17 and a bottom stop 18, receiving movably, an opaque plate 19 through which is cut a license number as shown at 20. An abbreviation indicating the State in which the license is granted may be cut through the plate 15 as shown at 21, and as indicated at 22, characters indicating the year in which the license is granted, may be cut through the opaque plate.

The front 3 embodies fingers 23 holding in place, to the rear of the opaque plate 19 and to the rear of the face plate 15 a translucent plate 24 which may be made of frosted or ground glass. The front 3 and the rear 2 of the signal casing may be held together by securing devices 25 of any desired sort.

Brackets 26 are attached to the ends of the back 6 of the signal casing and support electric lamps 27 and 30, these lamps being located in the compartment 14 to the rear of the characters 20, 21 and 22 cut in the removable plate 19. Brackets 28 are carried by the transverse partition 11, the brackets supporting electric lamps 29 and 31. The lamps 29 and 31 are colored and may be red.

Structures such as that above described are mounted on the front and on the rear of the vehicle 1, as clearly indicated in Fig. 1 of the drawings.

In Fig. 6 of the drawings, there appears a diagram showing the circuits of the various lamps, and for convenience in describing the operation of the structure, the lamps at the front of the vehicle have been designated by the reference characters 32, 33, 34 and 35.

The numeral 36 indicates a source of electrical energy, such as a battery, carried on any accessible portion of the vehicle 1. From one side of the battery 36, a conductor 37 leads to the switch 4, and branched off from the conductor 37 is a conductor 39 which leads to the switch 5. The switch 5 is adapted to coöperate with either one of a pair of switch points designated by the reference characters 40 and 41. A conductor 42 leads from the switch point 40 to one side of the lamp 35, and from the other side of the lamp 35, a conductor 43 leads to the opposite side of the battery 36. Branched off from the conductor 42 is a conductor 44 which leads to one side of the lamp 31 and leading from the other side of the lamp 31 is a conductor 45 which is connected to the conductor 43. A conductor 46 leads from the switch point 41 to one side of the lamp 34 and from the other side of the lamp 34, a conductor 47 leads to the conductor 43. A conductor 48 leads from the conductor 46 to one side of the lamp 29, and from the other side of the lamp 29, a conductor 49 leads to the conductor 45. The switch 4 is adapted to coact with a switch point 50 and from the switch point 50, a conductor 51 leads to one side of lamp 33. Extended from the other side of lamp 33 is a conductor 52 which is connected to the conductor 43. Branched off from the conductor 51 is a conductor 53 leading to one side of the lamp 32 and leading from the other side of the lamp 32 is a conductor 54 which is connected to to the conductor 43. A conductor 55 leads from the conductor 53 to one side of the lamp 27 and leading from the other side of the lamp 27 is a conductor 56 which is connected to the conductor 45. From the conductor 55 a conductor 57 leads to one side of the lamp 30, and from the other side of the lamp 30, the conductor 58 leads to a conductor 45.

It is possible to light simultaneously, the lamps 31 and 35, thereby to illuminate the indicators 16 at the front and the rear of the vehicle, these indicators pointing toward one side of the vehicle and designating that the vehicle is about to be turned in the direction in which the indicators point. When it is desired to light the lamps 35 and 31, the switch 5 is brought into contact with the switch point 40 and then the following circuits are established:—the battery 36, the conductor 37, the conductor 39, the switch 5, the switch point 40, the conductor 42, the lamp 35, the conductor 43, and the battery 36. Another circuit established when the switch 5 is on the point 40 is as follows:— the battery 36, the conductor 37, the conductor 39, the switch 5, the switch point 40, the conductor 42, the conductor 44, the lamp 31, the conductor 45, the conductor 43 and the battery 36.

From the foregoing it will be observed that when the switch 5 is in contact with the point 40, the lamps 35 and 31 will be lighted, thus indicating, in Fig. 6, that the vehicle is about to be turned to the right.

Presupposing that the occupant of the vehicle desires to signal that he is about to turn to the left, then the lamps 34 and 29 are lighted. Under such circumstances, the switch 5 is placed on the switch point 41 and then the following circuits are established:—the battery 36, the conductor 37, the conductor 39, the switch 5, the switch point 41, the conductor 46, the lamp 34, the conductor 47, the conductor 43 and the battery 36. The other circuit established when the switch 5 is on the switch point 41 is as follows:—the battery 36, the conductor 37, the conductor 39, the switch 5, the switch point 41, the conductor 46, the conductor 48, the lamp 29, the conductor 49, the conductor 45, the conductor 43 and the battery 36.

From the foregoing it will be observed that the operator of the vehicle has under his control, a means whereby the indicator lamps at either side of the vehicle may be lighted simultaneously at the front of the vehicle and at the back thereof.

The lamps 27, 30, 32 and 33 are lighted simultaneously to illuminate the characters 20, 22 and 21, this operation being carried out by moving the switch 4 into contact with the switch point 50. Under such circumstances, the following circuits are established:—the battery 36, the conductor 37, the switch 4, the switch point 50, the conductor 51, the lamp 33, the conductor 52, the conductor 43 and the battery 36. The second circuit established is as follows:— the battery 36, the conductor 37, the switch 4, the switch point 50, the conductor 51, the conductor 53, the lamp 32, the conductor 54, the conductor 43, and the battery 36. The third circuit established is as follows:— the battery 36, the conductor 37, the switch 4, the switch point 50, the conductor 51, the conductor 53, the conductor 55, the lamp 27, the conductor 56, the conductor 45, the conductor 43 and the battery 36. The fourth circuit established when the switch 4 is in contact with the switch point 50 is as follows:—the battery 36, the conductor 37, the switch 4, the switch point 50, the conductor 51, the conductor 53, the conductor 55, the conductor 57, the lamp 30, the conductor 58, the conductor 45, the conductor 43 and the battery 36.

The general operation of the device is such that the operator may light or extinguish the lamps 32, 33, 30 and 27, simultaneously, and may light or extinguish the lamps 35 and 31 upon the one hand, or the lamps 34 and 29 upon the other hand.

The conductors which lead to the lamps 29 and 31 are carried, respectively, in conduits 76 and 75, the conductors leading to the lamps 27 and 30 being carried in conduits 77 and 78, the conduits 77, 76, 75 and 78 being received in a trunk conduit 79, passing through the bottom of the casing through an insulating bushing 80 which may be held in place by a nut 81 or otherwise, the construction last above discussed being shown most clearly in Fig. 4 of the drawings.

Having thus described the invention, what is claimed is:—

In a vehicle signal, a casing comprising a front and a back telescoped into the front; an opaque plate constituting a part of the front and closing the upper portion of the front, the opaque plate having openings shaped to form indicators which point laterally in opposite directions; side guides and a bottom stop on the front below the opaque plate; a second plate removably mounted in the guides and engaged by the bottom stop, the second plate being perforated to disclose license data, the guides outstanding in front of the opaque plate whereby the latter will act as a directing element for the second plate during the insertion of the opaque plate into the guides; a longitudinal partition in the back and lying between the indicators on the one hand and the license data on the other hand; a transverse partition in the back and extended between the top of the back and the longitudinal partition, the transverse partition lying between the indicators; a translucent plate located to the rear of the opaque plate and the second plate and held in position by the partitions; lower lamps secured to the ends of the back and located below the longitudinal partition; upper lamps projecting in opposite directions from the transverse partition and located above the longitudinal partition; and means for connecting the front and the back of the casing, to hold the same against relative movement; the second plate being removable while the front and the back of the casing are connected, and the back and the front being separable to permit a removal of the translucent plate and to give access to all of the lamps.

In testimony that I claim the foregoing as my own, I have hereto affixed my signature in the presence of two witnesses.

HORACE B. KINCAID.

Witnesses:
R. A. BATEMAN,
G. W. B. OLMSTEAD.